(12) United States Patent
Stawski et al.

(10) Patent No.: US 10,694,763 B2
(45) Date of Patent: Jun. 30, 2020

(54) CONFECTIONERY COATINGS COMPRISING SUCROSE ESTERS

(71) Applicant: WM. WRIGLEY JR. COMPANY, Chicago, IL (US)

(72) Inventors: Barbara Stawski, Oak Park, IL (US); Penny Frances Martin, Chicago, IL (US); Jiri Baron, Prague (CZ)

(73) Assignee: W.M. WRIGLEY JR. COMPANY, Chicago, IL (US)

( * ) Notice: Subject to any disclaimer, the term of this patent is extended or adjusted under 35 U.S.C. 154(b) by 616 days.

(21) Appl. No.: 14/777,286

(22) PCT Filed: Mar. 14, 2014

(86) PCT No.: PCT/US2014/026973
§ 371 (c)(1),
(2) Date: Sep. 15, 2015

(87) PCT Pub. No.: WO2014/152120
PCT Pub. Date: Sep. 25, 2014

(65) Prior Publication Data
US 2016/0015054 A1    Jan. 21, 2016

Related U.S. Application Data

(60) Provisional application No. 61/794,994, filed on Mar. 15, 2013.

(51) Int. Cl.
*A23G 4/20* (2006.01)
*A23G 3/54* (2006.01)
(Continued)

(52) U.S. Cl.
CPC .............. *A23G 4/20* (2013.01); *A23G 3/343* (2013.01); *A23G 3/42* (2013.01); *A23G 3/54* (2013.01);
(Continued)

(58) Field of Classification Search
CPC ........ A23G 3/0095; A23G 3/54; A23G 3/343; A23G 3/42; A23G 4/06; A23G 4/10; A23G 4/20
(Continued)

(56) References Cited

U.S. PATENT DOCUMENTS

2007/0048431 A1*  3/2007  Budwig .............. A23D 7/0053
                                                         426/602
2007/0116825 A1*  5/2007  Prakash .................. A23G 1/32
                                                         426/548
(Continued)

FOREIGN PATENT DOCUMENTS

EP       0273000 B1   9/1991
WO    WO 2008104383 A2 *  9/2008  .............. A23G 3/36
WO    WO2009036954 A1   3/2009

OTHER PUBLICATIONS

Mitsubishi-Kagaku Foods Corporation, Type of Sugar Esters: RYOTO Sugar Ester (Food Grade), 2000, 1 page.*

*Primary Examiner* — Jyoti Chawla

(57) ABSTRACT

Coated confectionery products and methods of manufacturing the same are disclosed herein. The coated confectionery products include a confectionery center. A first coating including a carbohydrate and a buffered acid surrounds the confectionery center. A second coating including a carbohydrate and a sucrose esters surrounds the first coating. A third coating including a carbohydrate, a colorant, and a flavorant surrounds the second coating. In addition, a fourth coating including a polishing agent surrounds the third coating.

15 Claims, 1 Drawing Sheet

(51) Int. Cl.
*A23G 4/06* (2006.01)
*A23G 3/34* (2006.01)
*A23G 3/42* (2006.01)
*A23G 4/10* (2006.01)

(52) U.S. Cl.
CPC .............. *A23G 4/06* (2013.01); *A23G 4/062* (2013.01); *A23G 4/10* (2013.01); *A23V 2002/00* (2013.01)

(58) Field of Classification Search
USPC ......................................... 426/103, 89, 303
See application file for complete search history.

(56) References Cited

U.S. PATENT DOCUMENTS

| | | | |
|---|---|---|---|
| 2007/0141198 A1* | 6/2007 | Yang ........................ | A23G 3/54 426/3 |
| 2007/0269577 A1* | 11/2007 | Pershad ................. | A23G 3/343 426/607 |
| 2011/0129563 A1* | 6/2011 | Ashokan ................ | A23G 3/364 426/5 |
| 2013/0071516 A1* | 3/2013 | Elejalde ................... | A23G 3/54 426/5 |

* cited by examiner

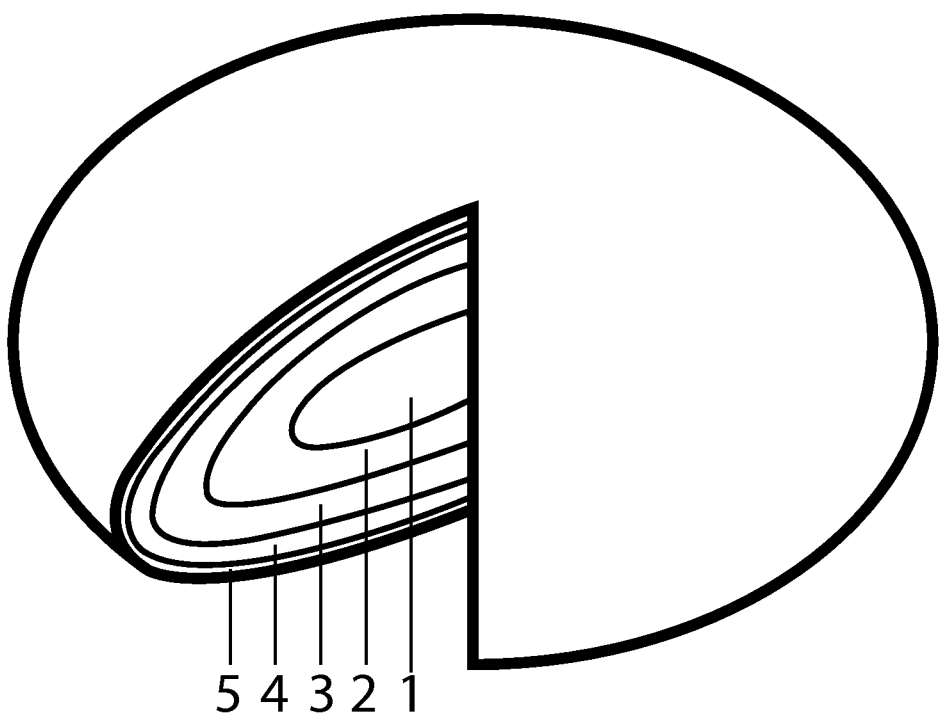

CONFECTIONERY COATINGS COMPRISING SUCROSE ESTERS

PRIORITY DATA

The present patent application is a 371 of International Application Ser. No. PCT/US14/26973 filed Mar. 14, 2014, which claims benefit from Ser. No. 61/794,994 filed Mar. 15, 2013. The applications listed above are incorporated by reference from as if entirely restated herein.

BACKGROUND OF THE INVENTION

1. Field of the Invention

The present disclosure relates to coated confectionery products. More particularly, the present disclosure relates to confectionery products containing a sucrose ester in their coatings.

2. Description of the Related Art

Confectionery products and chewing gums are frequently enclosed in soft or hard coatings. The coatings can be made from a variety of sugar containing syrups or sugar free syrups. Other ingredients can be included in the coating syrups as well, such as flavors, colors, and sweeteners. Coatings allow a manufacturer to modify certain characteristics of the confectionery product, such as taste and texture.

In a typical coating or panning process, a confectionery center is provided in a revolving pan and coating syrup is applied thereto. The coating process can be repeated multiple times until the desired coating structure has been obtained. In some cases, after a coating is applied, time is allowed for the coating to dry before a subsequent coating is applied. Thus, if multiple coatings are desired for a particular product, total drying time can become an issue. Further, when applying multiple coatings to a product, problems can arise with respect to ingredients from one coating migrating into a different coating. Other problems can arise if the coating syrup contains ingredients that crystallize too quickly. Moreover, the color scheme of certain confectionery products can be important and thus, the chemical composition of the coating must be finely tuned to provide the product with the desired color.

Therefore, while certain coating syrup mixtures may be available in the art, there is a continuing need to refine these syrups to maximize the particular product characteristics desired by a manufacturer.

BRIEF SUMMARY OF THE INVENTION

Coated confectionery products are disclosed herein. In one aspect, the coated confectionery product comprises a confectionery center; a first coating surrounding the confectionery center, wherein the first coating comprises a carbohydrate and a buffered acid; a second coating surrounding the first coating, wherein the second coating comprises a carbohydrate and a sucrose ester; a third coating surrounding the second coating, wherein the third coating comprises a carbohydrate, a colorant, and a flavorant; and a fourth coating surrounding the third coating, wherein the fourth coating comprises a polishing agent.

Methods of manufacturing confectionery products are also disclosed herein. In one aspect, the method comprises the steps of providing a confectionery center; coating the confectionery center with a first coating syrup comprising a carbohydrate and a buffered acid solution to form a first coating; coating the first coating with a second coating syrup comprising a carbohydrate and a sucrose ester to form a second coating; coating the second coating with a third coating syrup comprising a carbohydrate, a colorant, and a flavorant to form a third coating; and coating the third coating with a fourth coating comprising a polishing agent.

The foregoing has outlined rather broadly the features and technical advantages of the present disclosure in order that the detailed description that follows may be better understood. Additional features and advantages of the disclosure will be described hereinafter that form the subject of the claims of this application. It should be appreciated by those skilled in the art that the conception and the specific embodiments disclosed may be readily utilized as a basis for modifying or designing other embodiments for carrying out the same purposes of the present disclosure. It should also be realized by those skilled in the art that such equivalent embodiments do not depart from the spirit and scope of the disclosure as set forth in the appended claims.

BRIEF DESCRIPTION OF THE SEVERAL VIEWS OF THE DRAWINGS

A detailed description of the invention is hereafter described with specific reference being made to the drawings in which:

FIG. 1 is a cross-sectional view of an aspect of the presently disclosed coated confectionery product.

DETAILED DESCRIPTION OF THE INVENTION

Pan-coated confectioneries and methods of manufacturing panned confections are disclosed herein. Panning is a process whereby a center, such as a confectionery center, is tumbled in a revolving pan and coated with one or more coatings. The panning process can be used to apply a soft coating or a hard coating to a confectionery center. The present disclosure is applicable to both hard and soft panned coatings.

In a typical hard panning process, hard sugar coatings are obtained by applying a syrup solution to the confectionery centers in the revolving pan. After an application of the coating, the syrup solution can be allowed to dry or crystallize around the confectionery center and subsequently, an additional coating layer can be applied. This process can be repeated as many times as necessary to obtain the appropriate amount of coating layers.

The syrup solution can be dried by heating the outside of the revolving pan or by passing heated air into the revolving pan. In certain aspects, forced heated air contacts the wet syrup coating in a temperature range from about 70° F. to about 110° F. In other aspects, the heated air is in a temperature range from about 80° F. to about 100° F. The heated air may be passed over and admixed with the syrup coated centers in any way commonly known in the art. For example, the heated air is blown over and around the syrup coated centers at a flow rate, for large scale operations, of about 2800 cubic feet per minute. If lower quantities of material are being processed, or if smaller equipment is used, lower flow rates can be used. If a flavorant is applied after a syrup coating has been dried, the flavorant can be dried with or without the use of a drying medium. When dealing with heat-sensitive confectionery centers, cooled air can also be used. Coated confections are then removed from the pan and allowed to dry overnight.

A typical soft panning process generally includes applying a coating of a noncrystallizing syrup solution followed by a coating of a crystallizing syrup. This process is repeated until the desired number of coatings has been obtained. In certain processes, the soft coating can be formed by adding a dry charge or powder coating before or after a liquid coating. The dry charge may comprise natural carbohydrate gum hydrolysates, maltodextrin, gelatin, cellulose derivatives, starches, modified starches, sugars, sugar alcohols (i.e. polyols), natural carbohydrate gums and fillers like talc and calcium carbonate.

The confectionery center to which the coating can be applied can be chosen from a wide variety of confectionery materials. For example, the confectionery center can comprise jelly candies, pressed tablets, mints, chewy candies, hard boiled candies, chocolates, nougats, licorice, taffy, gels, solid foam, crystallized pastes, rework, or combinations thereof. The confectionery center can also comprise a chewing gum.

In certain aspects, the center is a compressed tablet made by conventional means. A compressed tablet is a mixture containing any combination of base materials, sweeteners, thickeners, colorants, binders, flavorants, and lubricants. The base material may be a sugar or a polyol. Among the sugars that may be used are sucrose, dextrose, lactose, maltose, and other common carbohydrates, such as isomaltulose. In addition, base materials may include non-sugar bulking agents. Among these are polyols such as sorbitol, maltitol, mannitol, xylitol, isomalt, lactitol, erythritol, and combinations thereof.

Thickeners include corn syrup, gelatin, pectin, and other common thickeners. They can be added in any amount that will achieve the desired organoleptic effect.

Binders that are commonly used in compressed tablets are natural gums and hydrocolloids such as gum arabic, guar gum, agar, alginates, gum tragacanth, gelatin, corn syrup, starches, and maltodextrins. The most commonly used binders are gelatin, gum arabic, and maltodextrins or corn syrups. When non-sugar polyols, such as sorbitol, are used as the base material, binders are not needed for binding since many of these polyols are easily compressed to form tablets. In some cases, polyols may also act as a binder and may be combined with sugar to form the base materials for the compressed tablet. In certain aspects, binders can comprise about 2% to about 8% of the tablet.

Lubricants can also be used to provide the tablet with good release properties from the press tooling or die and punches. A variety of lubricants or non-stick agents may be used in a tablet to act as release agents. Some of these are starch, acetylated monoglycerides, waxes, lecithins, emulsifiers, and mono-, di-, or tristearates. The most common of these lubricants are magnesium or calcium stearate and stearic acid. Solid lubricants are added to the tablet composition to help form the tablet and allow for its release from the tablet press. In certain aspects, lubricants can comprise about 0.5% to about 2% of the tablet. In some instances, low levels of flow agents such as silicon dioxide are added to the tablet composition to help the flow of the mixture into the tablet press.

In one aspect of the present disclosure, the confectionery center comprises a chewy candy center. The chewy center may comprise sugar, corn syrup, fat and optionally, gelatin. In certain aspects, the chewy center comprises gelatin in an amount of about 1% to about 2% and fat in an amount of about 4% to about 10% by weight of the center.

In another aspect, the confectionery center may comprise a gummy candy center. The gummy center can comprise sugar, corn syrup, gelatin and optionally, pectin. In certain aspects, the gummy center comprises gelatin in the amount of about 4% to about 8% and pectin in the amount of about 0.5% to about 1% by weight of the center.

In an alternate aspect, the confectionery center comprises a soft chewy or a soft gummy candy center. The soft chewy or gummy center may comprise sugar, corn syrup and pectin. In certain aspects, pectin can be present in amounts ranging from about 0.5% to about 2% by weight of the center.

In yet a further aspect, the confectionery center may comprise a pressed chewy candy center. The pressed chewy center may comprise sugar, corn syrup, and fat. In certain aspects, the pressed chewy center comprises sugar in the amount of about 50% to about 60%, corn syrup in the amount of about 30% to about 40%, and fat in the amount of about 1% to about 5% by weight of the center.

In other aspects, the center comprises or consists essentially of hydrocolloids or starches.

In further aspects of the present disclosure, the center contains a chewing gum composition. In general, a chewing gum composition typically comprises a water-soluble bulk portion, a water insoluble chewable gum base portion and typically water-insoluble flavoring agents. The water-soluble portion dissipates with a portion of the flavoring agent over a period of time during chewing. The gum base portion is retained in the mouth throughout the chew.

The insoluble gum base generally comprises elastomers, resins, fats and oils, softeners and inorganic fillers. The gum base may or may not include wax. The insoluble gum base can constitute about 5% to about 95% by weight of the chewing gum, more commonly the gum base comprises about 10% to about 50% of the gum, and in some aspects, the insoluble gum base comprises about 25% to about 35% by weight, of the chewing gum. In pellet gum center formulations, the level of insoluble gum base may be much higher.

In addition to a water-insoluble gum base portion, a chewing gum composition may also include a water-soluble bulk portion and one or more flavorants. The water-soluble portion can include bulk sweeteners, high-intensity sweeteners, flavorants, softeners, emulsifiers, colors, acidulants, fillers, antioxidants, and other components that provide desired attributes.

In any aspect disclosed herein, flavorants can be included in the confectionery centers and the coatings of the confectionery centers. As non-limiting examples, the flavorants may comprise essential oils, synthetic flavors, or mixtures including, but not limited to, oils derived from plants and fruits such as citrus oils, fruit essences, peppermint oil, spearmint oil, clove oil, oil of wintergreen, anise, and the like. Artificial flavorants are also contemplated for use in confectionery centers and coatings of the present invention. Those skilled in the art will recognize that natural and artificial flavorants may be combined in any sensorially acceptable blend. All such flavorants and flavorant blends are intended to be covered by the present disclosure. Furthermore, encapsulated flavorants are intended to be within the scope of the present disclosure.

High-intensity sweeteners can also be added to the confectionery centers and coatings disclosed herein. They can include, but are not limited to, synthetic substances, saccharin, thaumatin, alitame, saccharin salts, aspartame, and N substituted APM derivatives such as neotame, sucralose and acesulfame-K. The high-intensity sweetener may be added to the coating syrup in an amount such that the coating will contain from about 0.01% to about 2.0%, or from about 0.1% to about 1.0% high-intensity sweetener. In certain aspects, the high-intensity sweetener is not encapsulated.

Coloring agents or colorants can also be included in the confectionery centers and/or coatings disclosed herein. Colorants are preferably added directly to the coating syrup in the dye, natural, or lake form. Colorants may be artificial, natural, or any combination thereof. Colorants contemplated by the present disclosure include food quality dyes and any other type of colorant known in the art.

In an aspect of the present disclosure, a confectionery product is provided (see FIG. 1). The confectionery product can include any of the aforementioned confectionery centers. In certain aspects, the confectionery center (1) consists essentially of a water soluble matrix. In other aspects, the confectionery center (1) is substantially free of a gum base or a gum elastomer, or is completely free of a gum base and gum elastomer. In a further aspect, the confectionery center (1) comprises or consists essentially of hydrocolloids or starches.

Moreover, the confectionery center (1) can be coated with a plurality of coatings. In one aspect, a first coating (2) is applied to the confectionery center. Any coating referred to herein can be applied to the confectionery center, or to a layer coating the confectionery center, according to the panning processes described above. The first coating (2) can include a carbohydrate and a buffered acid. The carbohydrate can be a sugar, such as sucrose, lactose, dextrose, isomaltulose, or fructose. Sugar alcohols can also be used, such as xylitol, maltitol, or isomalt. In certain aspects, the first coating comprises from about 90% to about 99.5% of the carbohydrate and from about 0.5% to about 10% of the buffered acid. In other aspects, the first coating comprises about 98% of the carbohydrate and about 2% of the buffered acid. The buffered acid can be prepared in a solution comprising from about 60% to about 70% water, from about 20% to about 30% of an acid, and from about 5% to about 10% of a buffering agent. The acid can be any acid, or a combination of acids. In certain aspects, the acids are selected from the group consisting of citric acid, lactic acid, ascorbic acid, tartaric acid, and malic acid. Buffering agents can be selected by one of ordinary skill in the art and can be based upon the chosen acid. For example, if the acid was citric acid, the buffering agent could be trisodium citrate.

A second coating (3) surrounds the first coating. In certain aspects, the second coating (3) comprises a carbohydrate and a sucrose ester. The carbohydrate can be selected from the carbohydrates previously disclosed in this application or any other carbohydrate known in the art. The sucrose ester can be selected from sucrose monoesters, sucrose diesters, sucrose triesters, etc, and any combination thereof. In certain aspects, the coating comprising the sucrose ester only further comprises a carbohydrate. That is, in this aspect, the second coating consists essentially of a carbohydrate and sucrose esters and does not comprise any acid or any colorant. In one aspect, the sucrose ester comprises from about 25% to about 35% sucrose monoesters. In another aspect, the sucrose ester comprises from about 45% to about 55% sucrose monoesters. In an additional aspect, the sucrose ester comprises from about 65% to about 75% sucrose monoesters. In a particular aspect, the sucrose ester comprises about 50% sucrose monoesters.

The coating containing the sucrose ester can include about 0.1% to about 1% sucrose ester, on a dry weight basis. In certain aspects, the coating comprises from about 0.3% to about 0.7% sucrose ester, on a dry weight basis. In a particular aspect, the coating comprising the sucrose ester comprises about 0.7% sucrose ester, by dry weight of the coating. When comparing the total amount of sucrose ester present in the coating to the total weight of all of the coating layers surrounding the confectionery center, the sucrose ester may be from about 0.01% to about 0.75% of the total weight of all of the coating layers surrounding the confectionery center.

When preparing the syrup solution for the second coating, the sucrose ester can first be diluted in a sugar syrup. In certain aspects, a solution is formed containing about 1% to about 20% sucrose ester. In other aspects, a solution is formed containing about 5% to about 10% sucrose ester. The sucrose ester solution is then added to a carbohydrate containing syrup. In some aspects, the sucrose ester solution is added to the carbohydrate containing syrup such that the resulting mixture contains from about 5% to about 20% of the sucrose ester. In other aspects, a solution of about 5% sucrose ester is added to the carbohydrate containing syrup such that the resulting mixture contains about 10% of the sucrose ester. The resulting mixture is then applied as a coating to the confectionery product.

The sucrose ester can have a hydrophilic lipophilic balance (HLB) of from about 10 to about 16.

The second coating can be surrounded by a third coating (4). In certain aspects, the third coating (4) comprises a carbohydrate, a colorant, and a flavorant, or combination of one or more flavorants. As an illustrative example, the third coating may comprise from about 85% to about 95% of the carbohydrate, from about 0.05% to about 15% of the colorant, and from about 0.05% to about 1% of the flavorant. The flavorant can be selected from any flavorant disclosed in the present application or any other flavorant commonly used in the art. Suitable colorants can be selected by one of skill in the art. Optionally, the third coating may also include a sucrose ester.

Finally, in certain aspects, the third coating is surrounded by a fourth coating (5). The fourth coating (5) can comprise a polishing agent. The polishing agent can be a wax. The fourth coating can be the final coating and it can be acid free and color free.

The present disclosure is intended to cover any number of coatings surrounding the confectionery center. For example, a confectionery center with a first coating, a second coating, a third coating, and a fourth coating was disclosed above. However, a fifth coating, sixth coating, seventh coating, etc., may be used. Furthermore, although a first coating, second coating, third coating, and fourth coating were specifically disclosed above, there could be a separate and distinct coating in between the confectionery center and the first coating, between the first coating and the second coating, between the second coating and the third coating, and/or between the third coating and the fourth coating. For example, the second coating can cover the first coating by covering a different coating that also covers the first coating. Moreover, each distinct coating can be applied any number of times. For example, the first coating may be applied any number of times to produce a product having any number of layers of the first coating, such as 1 to 20 layers of the first coating. Each layer of a particular coating has the same composition. Next, the second coating can be applied any number of times to produce a product having any number of layers of the second coating, such as 1 to 20 layers of the second coating. The same is true for all additional coatings to be applied to the confectionery product.

Methods of manufacturing such pan coated confectionery products are also disclosed herein. These methods can be carried out using a conventional pan coating apparatus. In one aspect, the method of manufacturing the confectionery product includes the step of providing a confectionery center. The confectionery center can be any confectionery center disclosed herein or any other confectionery center known in the art. The method includes the step of coating the confectionery center with a first coating. In some aspects, the first coating may comprise a carbohydrate and a buffered acid, made from a syrup that contains a buffered acid solution. The method also includes the step of coating the first coating with a second coating. The second coating comprises a carbohydrate and a sucrose ester. The sucrose ester can be monoesters, diesters, triesters, etc., as previously disclosed above. The method further includes the step of coating the second coating with a third coating. In certain aspects, the third coating may comprise a carbohydrate, a colorant, and any flavorant, or combination of flavorants, previously disclosed herein. Optionally, the third coating may also contain a sucrose ester. The method can include a final step of coating the third coating with a fourth coating. The fourth coating may comprise a polishing agent, such as a wax. Further, the fourth or final coating may be acid free and color free.

The previously disclosed method can include any number of coating steps and each coating step can be carried out any number of times before moving to the next coating step. For example, the first coating may be applied any number of times, such as 1 to 20 times, thereby forming from 1 to 20 layers of the first coating. Each additional coating can also be applied any number of times to form any number of layers for each specific coating.

The carbohydrate syrup solutions used for the coatings disclosed herein can have a BRIX value from about 67 to about 73.

A coated confectionery product prepared according to any of the methods disclosed herein has many advantages over the prior art panned confections. For example, by using a sucrose ester in a coating, the coating forms a white background, which provides an enhanced color effect for the subsequently added color coating layer. Applicant has also found that sucrose esters are useful in protecting the inherent instability (sensitivity to temperature, pH, humidity, etc.) and composition of natural colorants, including but not limited to, beet, carrot, and spinach juices. Moreover, by incorporating the sucrose ester into the coating, the amount of time necessary for the coating to dry is reduced.

Furthermore, the sucrose ester coating acts to form an acid barrier. That is, the sucrose ester coating prevents the acid from the coating closest to the confectionery center from migrating towards the outer coatings, such as the color-containing coating. In this regard, experimental data has shown that when manufacturing a coated confectionery product not including a sucrose ester in a coating surrounding an internal coating containing an acid, the acid can migrate to an outer coating and form dark spots on the surface of the coated confectionery product. However, when the coating containing the acid is surrounded by a coating containing sucrose esters according to the present disclosure, the acid cannot migrate past the sucrose esters containing coating and thus, no dark spots are formed on the surface of the coated confectionery product by the acid. The sucrose ester coating also helps to control color distribution and protects against sucrose inversion. In certain cases, the sucrose is not able to properly crystallize due to sucrose inversion.

Accelerated shelf life testing conducted by Applicant (at 35° C. and 85% relative humidity) demonstrated that when sucrose esters were used in the second coating in a soft-panned, chewy center confectionery, the sucrose esters controlled deformation of the product, decreased color "spotting" in colorants, including natural colorants (such as South Hampton free colors, red, and purple as tested below) and reduced color carry over from other coatings. The confections utilized in this experiment were prepared according to the procedures described herein. Certain confections had a confectionery center, a first coating containing a carbohydrate and a buffered acid, a second coating containing a carbohydrate, a third coating containing a carbohydrate, a colorant, and a flavorant, and a fourth coating comprising wax. Other tested confections had a confectionery center, a first coating containing a carbohydrate and a buffered acid, a second coating containing a carbohydrate and sucrose esters (0.5% wet basis), a third coating containing a carbohydrate, a colorant, and a flavorant, and a fourth coating comprising wax. The shade difference between storage samples (after 5 weeks) was visually noticeable and the confections having sucrose esters in their coatings had improved color. Colorimeter data is shown below in Table 1. In this table, L=100 is white and L=0 is black. Also, a positive a* value describes the red component, a positive b* value describes the yellow component, and a negative b* value describes the blue component.

TABLE 1

Results comparing confections with and without sucrose ester coatings after 5 weeks storage at 35° C./85% RH.

| Sample Number | Description of the samples | L* | a* | b* | Visual shade assessment to supplement the L*a*b* values |
|---|---|---|---|---|---|
| 817 | Purple colored confection-no sucrose esters in coating | 48.6 | 8.97 | −1.3 | lighter, less blue, less red (less purple) than 818 |
| 818 | Purple colored confection with sucrose esters in second coating | 46.17 | 17.94 | −8.47 | darker, more blue, more red (stronger, more purple than 817) |
| 819 | Red colored confection-no sucrose esters in coating | 46.33 | 37.16 | 27.77 | lighter, less red, more yellow than sample 820 |
| 820 | Red colored confection with sucrose esters in second coating | 45.46 | 39.04 | 21.53 | darker, more red and less yellow than sample 819 |

Without wishing to be bound by any theories, it is hypothesized that the sucrose ester acts as nucleating sites during sugar crystallization, thereby enhancing the crystallization process, and the resulting crystals are smaller, more tightly packed in a specific order. These crystals can then reflect light better and make this coating appear white and thus, the sucrose esters coating can enhance the color in the subsequently applied color coating.

All of the compositions and methods disclosed and claimed herein can be made and executed without undue experimentation in light of the present disclosure. While the invention may be embodied in many different forms, there are described in detail herein specific preferred embodiments or aspects. The present disclosure is an exemplification of the principles of the invention and is not intended to limit the invention to the particular embodiments illustrated. In addition, unless expressly stated to the contrary, use of the term "a" is intended to include "at least one" or "one or more." For example, "a flavorant" is intended to include "at least one flavorant" or "one or more flavorants."

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

Furthermore, the invention encompasses any and all possible combinations of some or all of the various embodiments described herein. It should also be understood that various changes and modifications to the embodiments or aspects described herein will be apparent to those skilled in the art. Such changes and modifications can be made without departing from the spirit and scope of the invention and without diminishing its intended advantages. It is therefore intended that such changes and modifications be covered by the appended claims.

What is claimed is:

1. A pan-coated confectionery product comprising:
   a) a confectionery center;
   b) a first panned coating surrounding the confectionery center, wherein the first coating comprises a carbohydrate and a buffered acid;
   c) a second panned coating surrounding the first coating, wherein the second coating comprises a carbohydrate and a sucrose ester limiting migration of the buffered acid to outer coatings;
   d) a third panned coating surrounding the second coating, wherein the third coating comprises a carbohydrate, a colorant, and a flavorant; and
   e) optionally a fourth coating surrounding the third coating, wherein the fourth coating comprises a polishing agent.

2. The coated confectionery product of claim 1, wherein the confectionery center consists essentially of a water soluble matrix.

3. The coated confectionery product of claim 1, wherein the confectionery center is substantially free of gum base and gum elastomer.

4. The coated confectionery product of claim 1, wherein the confectionery center consists essentially of hydrocolloids.

5. The coated confectionery product of claim 1, wherein the first coating comprises about 90% to about 99.5% of the carbohydrate and from about 0.5% to about 10% of the buffered acid.

6. The coated confectionery product of claim 1, wherein the buffered acid in the coating is formed from a solution that comprises from about 60% to about 70% water, from about 20% to about 30% of an acid, and about 5% to about 10% of a buffering agent.

7. The coated confectionery product of claim 1, wherein the sucrose ester is selected from the group consisting of sucrose monoesters, sucrose diesters, sucrose triesters, and any combination thereof.

8. The coated confectionery product of claim 1, wherein the second coating comprises from about 0.1% to about 1% sucrose esters, on a dry weight basis.

9. The coated confectionery product of claim 1, wherein the third coating comprises from about 85% to about 95% of the carbohydrate, from about 0.05% to about 15% of the colorant, and from about 0.05% to about 1% of the flavorant.

10. The coated confectionery product of claim 1, wherein the sucrose ester comprises from about 0.01% to about 0.75% of a total weight of a combination of the first coating, the second coating, the third coating, and the fourth coating.

11. The coated confectionery product of claim 1, wherein at least one of the first coating, the second coating, the third coating, and the fourth coating comprises a plurality of layers.

12. The coated confectionery product of claim 1, wherein the polishing agent comprises a wax.

13. The coated confectionery product of claim 1, wherein the carbohydrate is selected from the group consisting of a sugar, a sugar alcohol, and any combination thereof.

14. The coated confectionery product of claim 1, wherein the sucrose ester has a hydrophilic lipophilic balance of from about 10 to about 16.

15. The coated confectionery product of claim 1, wherein the third coating comprises a sucrose ester.

* * * * *